(12) United States Patent
Chen

(10) Patent No.: US 8,028,966 B2
(45) Date of Patent: Oct. 4, 2011

(54) HANGER DEVICE

(75) Inventor: Henry Chen, Taipei (TW)

(73) Assignee: Protrend Co., Ltd., Taipei (TW)

( * ) Notice: Subject to any disclaimer, the term of this patent is extended or adjusted under 35 U.S.C. 154(b) by 384 days.

(21) Appl. No.: 12/389,790

(22) Filed: Feb. 20, 2009

(65) Prior Publication Data
US 2010/0213346 A1 Aug. 26, 2010

(51) Int. Cl.
*F16B 45/00* (2006.01)
(52) U.S. Cl. ............... 248/304; 248/307; 211/94.01; 211/59.1
(58) Field of Classification Search .......... 248/690, 248/691, 692, 215, 304, 305, 306, 307, 339, 248/220.21, 220.22, 221.11, 222.11; 211/106.01, 211/94.01, 57.1, 59.1, 54.1, 4, 70.6
See application file for complete search history.

(56) References Cited

U.S. PATENT DOCUMENTS

| | | | | |
|---|---|---|---|---|
| 5,265,929 A | * | 11/1993 | Pelham | 296/97.6 |
| 5,582,377 A | * | 12/1996 | Quesada | 248/229.12 |
| 7,484,701 B2 | * | 2/2009 | Hsieh | 248/339 |
| 7,837,166 B2 | * | 11/2010 | Liao et al. | 248/229.22 |
| 2011/0101183 A1 | * | 5/2011 | Ernst et al. | 248/216.1 |

* cited by examiner

*Primary Examiner* — A. Joseph Wujciak, III
(74) *Attorney, Agent, or Firm* — WPAT, PC; Justin King (57) ABSTRACT

A hanger device includes an open-back metal housing having two sidewalls formed with a notch each, and a hook connected to a bottom thereof; a plastic seat embedded in the metal housing and having a transverse recess; a release control element vertically slidably connected to the plastic seat; and at least one tension spring located between the release control element and the plastic seat. The notches have outward and downward inclined upper edges and a vertical sectional shape the same as the recess. The hanger device can be firmly attached to a horizontal rail with the inclined upper edges of the notches tightly hooked to a rearward and downward inclined upper end surface of the horizontal rail and a projected block on a top of the release control element upward pushed by the tension spring into an open-bottomed channel at a lower end surface of the horizontal rail.

8 Claims, 9 Drawing Sheets

HANGER DEVICE

FIELD OF THE INVENTION

The present invention relates to a hanger device, and more particularly to a hanger device that can be firmly attached to a horizontal hanging rail without the risk of automatically separating therefrom to thereby provide increased hook load and high reliability in supporting an article thereon.

BACKGROUND OF THE INVENTION

In addition to cars, there are still many different articles stored in a garage, such as hardware parts, tools and various kinds of devices. People usually use containers, cabinets, etc. to organize these articles, so as to keep the garage in order. However, some of the articles, such as a power saw, wound hoses and electric wires, spare tyres, round point shovels, collapsible handcart, etc., are preferably organized by hanging them on a wall, so that these articles can be more conveniently accessed and replaced while occupying less space in the garage.

Figure 1:
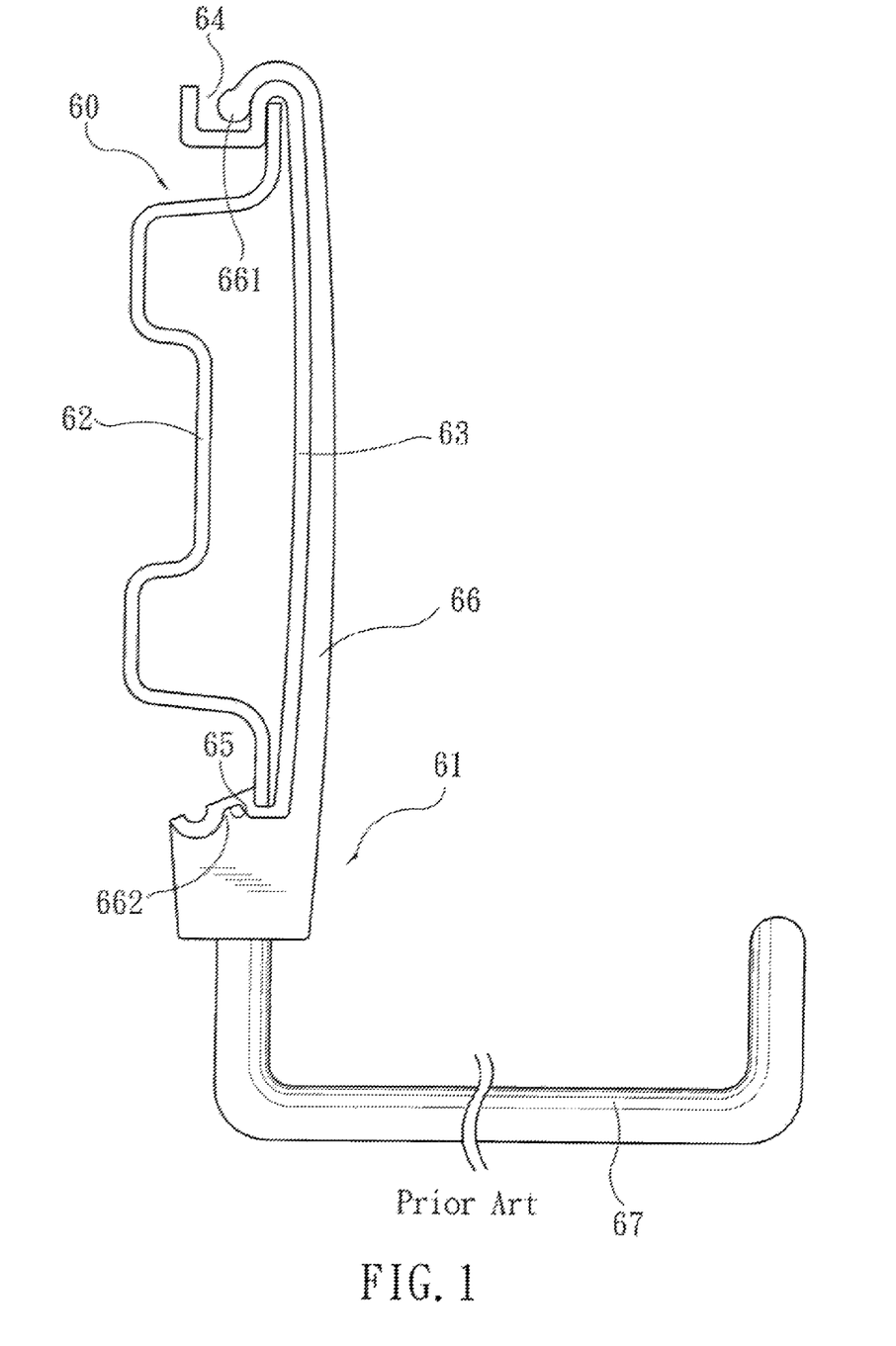

FIG. 1 shows the structure of a conventional horizontal hanging rail 60 and a hanger 61 attached to the horizontal hanging rail 60 for use. The horizontal hanging rail 60 includes a metal rail 62 horizontally and fixedly mounted on a wall, and a plastic cover 63 covered onto a front side of the metal rail 62. The plastic cover 63 has an upper and a lower end respectively formed into an upper and a lower retaining channel 64, 65. The hanger 61 includes a hook 67 and an engaging body 66 integrally connected to a top of the hook 67. The engaging body 66 has a bent upper end to provided a hooking head 661 for hooking to the upper retaining channel 64 of the plastic cover 63, and a lower end formed with an upward protruded rib 662 for fitly engaging with the lower retaining channel 65 of the plastic cover 63, such that the hanger 61 can be fixedly attached to the horizontal hanging rail 60. An article can be hooked on the hook 67 of the hanger 61.

The engaging body 66 of the hanger 61 is attached to the plastic cover 63 through force fit, so as to firmly hold to the horizontal hanging rail 60. The plastic cover 63 must long enough to cover a full length of the horizontal hanging rail 60, so that the hanger 61 can be attached to any position on the horizontal hanging rail 60. However, since only some positions on the horizontal hanging rail 60 have the hangers 61 attached thereto, it is not necessary to cover the full length of the metal rail 62 with the plastic cover 63. Therefore, with the conventional horizontal hanging rail 60, a lot of plastic material for forming the plastic cover 63 is actually wasted. Moreover, the engaging body 66 of the hanger 61 is attached to the plastic cover 63 of the horizontal hanging rail 60 through force fit, which provides relatively low connection strength. Thus, the hanger 61 tends to automatically separate from the horizontal hanging rail 60 easily.

It is therefore tried by the inventor to develop a hanger device that can be firmly and reliably hooked and attached to a horizontal hanging rail to provide increased hook load without the risk of automatically separating from the horizontal hanging rail.

SUMMARY OF THE INVENTION

A primary object of the present invention is to provide a hanger device that has a release-preventing structure to ensure safe attachment of the hanger device to a horizontal hanging rail without the risk of automatically separating therefrom and accordingly ensures high reliability in supporting an article thereon.

Another object of the present invention is to provide a hanger device that has a structure ensuring high connection strength between the hanger device and a horizontal hanging rail and accordingly provides increased hook load.

To achieve the above and other objects, the hanger device according to the present invention is designed for hooking and attaching to a horizontal hanging rail, which is horizontally fixedly mounted to a wall surface and has a horizontally extended rail portion. The hanger device includes a metal housing, a plastic seat, a release control element, and two tension springs.

The metal housing is an open-back case having two rearward extended sidewalls, on a rear edge of each of which a notch is formed. A hook is connected to a bottom of the metal housing for an article to hang thereon. The plastic seat is embedded in the metal housing via the open back thereof and is defined near a central portion with a transverse recess. The notches have inclined upper edges matching an inclined upper end surface of the rail portion of the horizontal hanging rail, so that the hanger device can be firmly hooked to the rail portion to thereby attach to the horizontal hanging rail.

In the present invention, the inclined upper edges of the notches on the metal housing are outward and downward inclined to have an inner end higher than an outer end thereof. The inclined upper end surface of the rail portion is rearward and downward inclined, allowing the inclined upper edges of the notches on the metal housing to fitly hook thereto.

The release control element for the hanger device of the present invention is vertically slidably connected to the plastic seat. The tension springs are located between the release control element and the plastic seat in a compressed state, so as to normally force the release control element upward to a highest possible position thereof relative to the plastic seat. The release control element is provided on a top with two upward projected blocks, which are pushed by the tension springs to normally protrude beyond lower edges of the notches on the metal housing.

The hanger device can be firmly and reliably attached to the horizontal hanging rail with the inclined upper edges of the notches and the inclined upper end surface of the recess hooked to the inclined upper end surface of the rail portion and the projected blocks on the top of the release control element upward extending into an open-bottomed channel at a lower end surface of the rail portion.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1 shows a conventional a horizontal hanging rail and a conventional hanger device attached to;

DETAILED DESCRIPTION OF THE PREFERRED EMBODIMENTS

Figure 2:
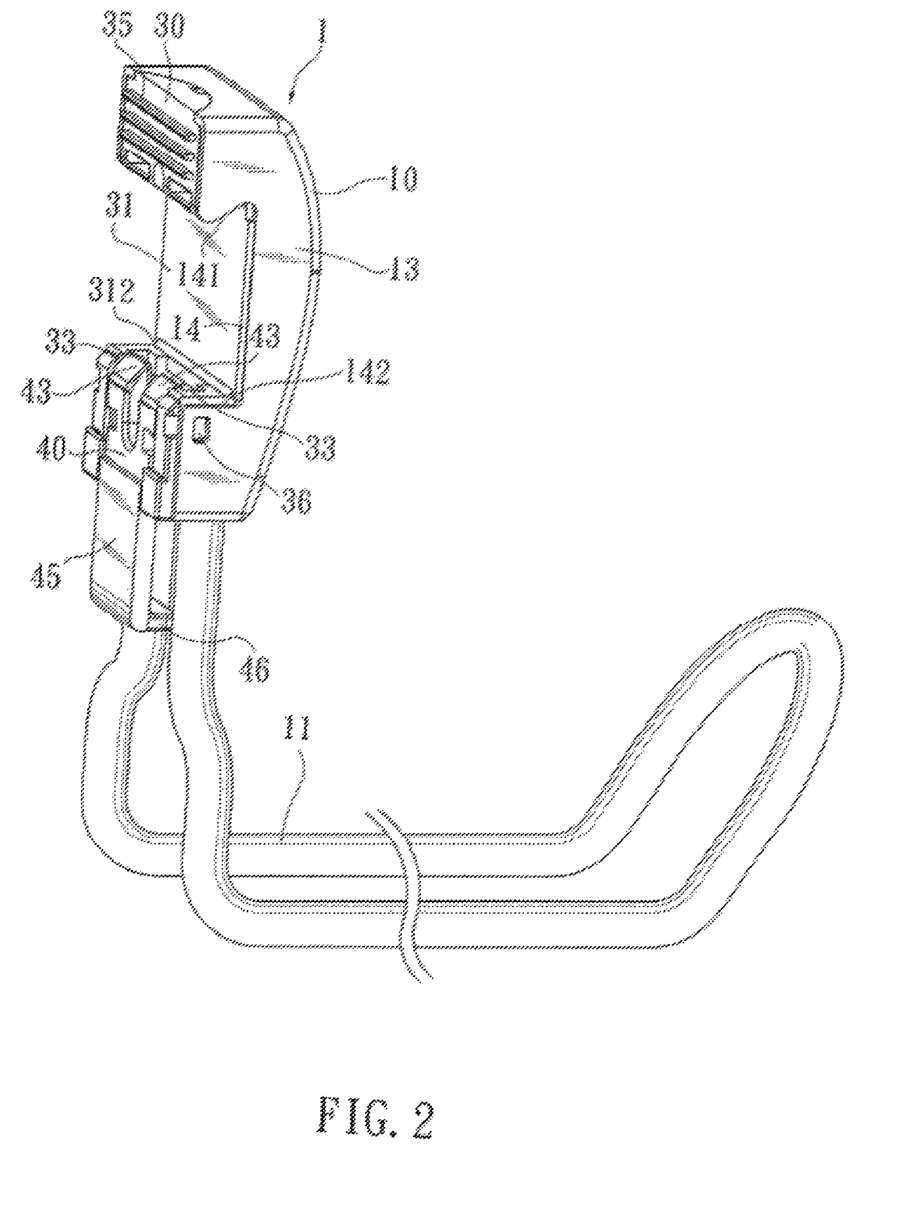
FIG. 2 is a rear assembled perspective view of a hanger device according to a preferred embodiment of the present invention.
Figure 3:
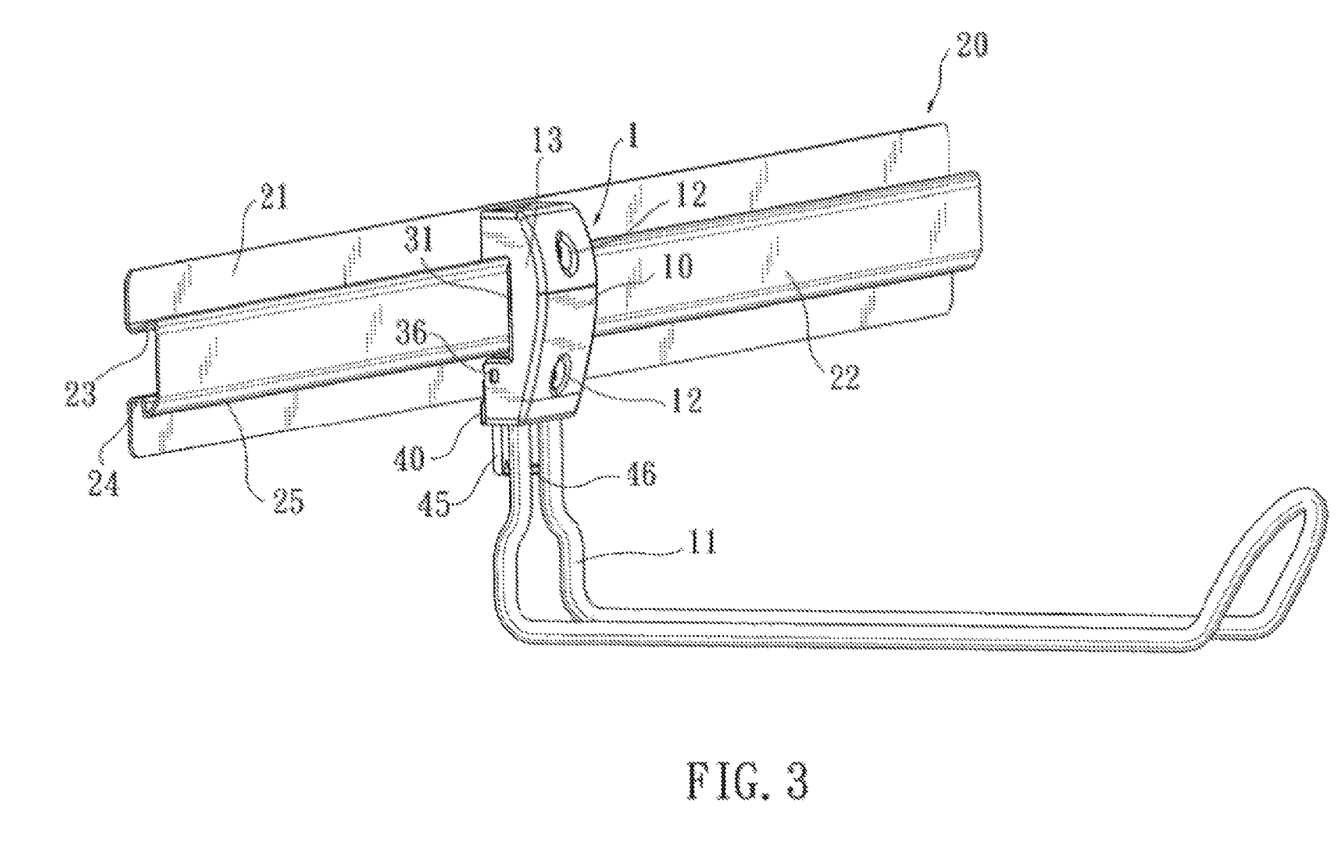
FIG. 3 is a front perspective view showing the hanger device of FIG. 2 being attached to a corresponding horizontal hanging rail.

Please refer to FIGS. 2 and 3, in which a hanger device 1 according to a preferred embodiment of the present invention for hooking and attaching to a horizontal hanging rail 20 for use is shown. The horizontal hanging rail 20 is horizontally fixedly mounted to a wall surface, and includes a horizontally extended and forward protruded rail portion 22, to which the hanger device 1 is hooked and firmly attached.

Figure 4:
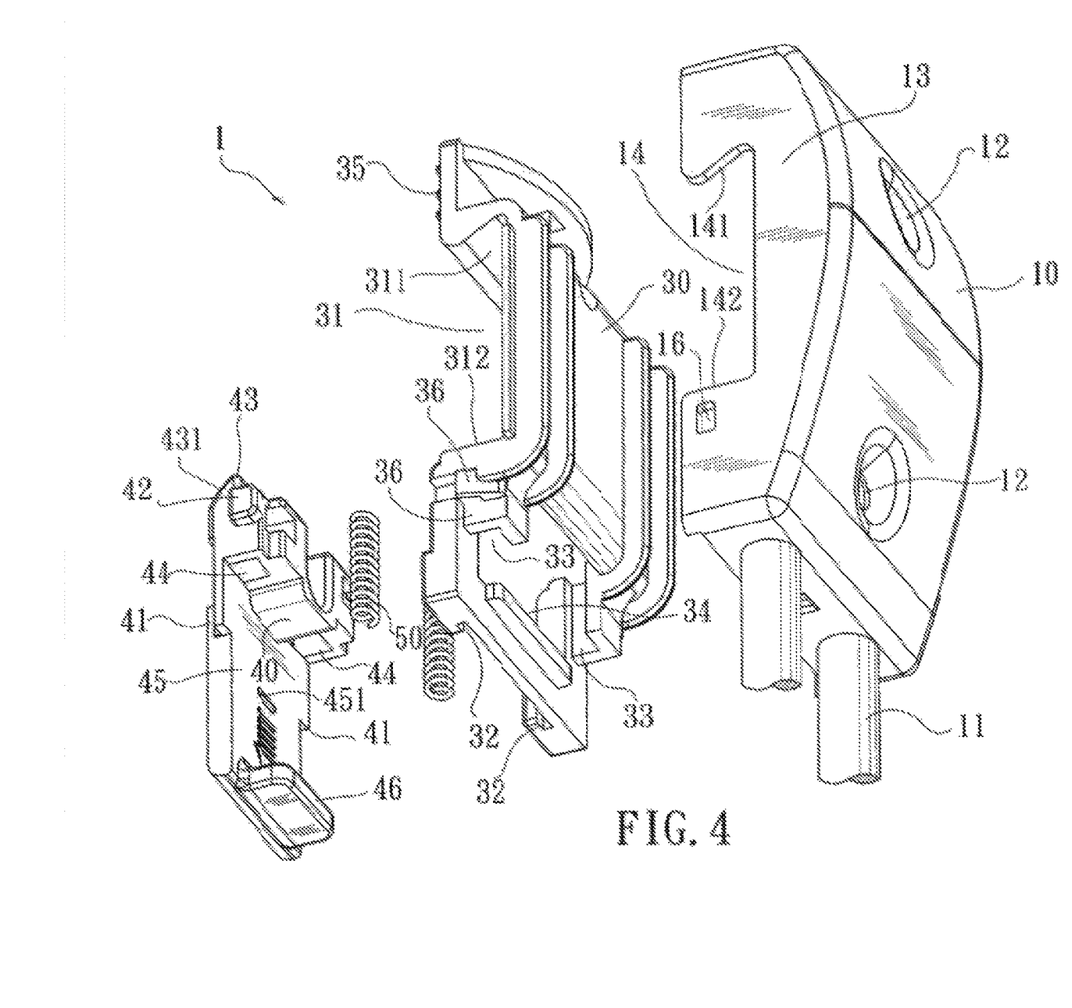
FIG. 4 is a front exploded perspective view of the hanger device of FIG. 2.
Figure 5:
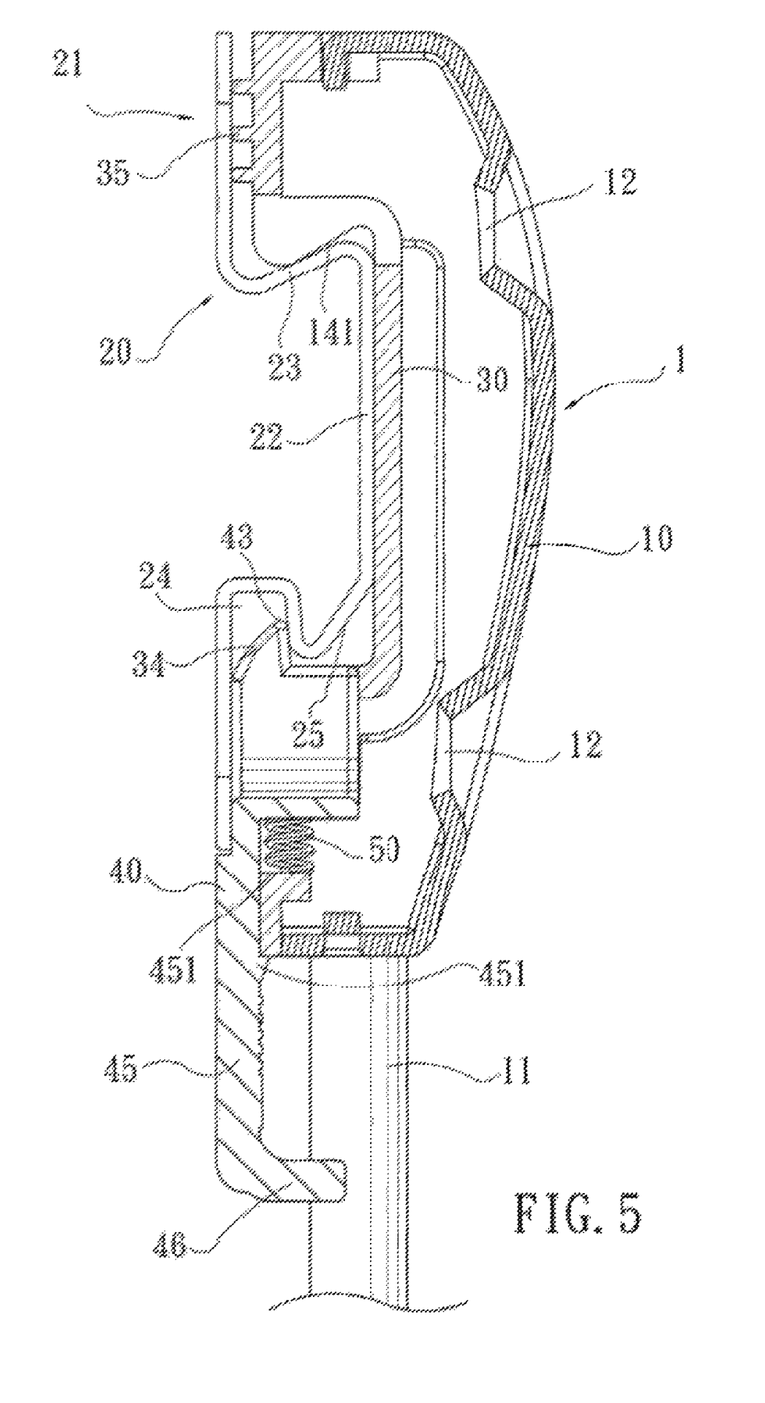
FIG. 5 is an assembled sectioned side view of the hanger device of FIG. 2 having been attached to the horizontal hanging rail.

As can be clearly seen from FIGS. 2, 4, and 5, the hanger device 1 according to the preferred embodiment of the present invention includes a metal housing 10, a plastic seat 30, a release control element 40 and two tension springs 50. The metal housing 10 is an open-back case, and the plastic seat 30 is inserted into and thereby embedded in the metal housing 10 via the open back thereof. The release control element 40 is assembled to the plastic seat 30 and can be moved upward and downward relative to the plastic seat 30 under control. The tension springs 50 are compressed between the release control element 40 and the plastic seat 30 to thereby normally force the release control element 40 to a highest possible position thereof relative to the plastic seat 30.

A hook 11 is connected to a bottom of the metal housing 10 for an article to hang thereon. The metal housing 10 has two sidewalls 13, on a rear edge of each of which a notch 14 is formed. The two notches 14 are identical and laterally symmetrical to each other. Each of the notches 14 has an inclined upper edge 141, such that an inner end of the inclined upper edge 141 is higher than an outer end thereof. The hook 11 is not restricted to any specific shape, and can be determined according to actual need. For instance, the hook 11 can be a substantially U-shaped long bar as illustrated in the preferred embodiment, or a curved hook (not shown).

The plastic seat 30 has a generally central portion defining a transverse recess 31. The recess 31 and the notches 14 on the metal housing 10 have the same longitudinal cross-sectional shape. The plastic seat 30 is embedded in the metal housing 10, such that an upper end surface 311 of the recess 31 does not downward protrude beyond the upper edges of the notches 14 formed on the two sidewalls 13 of the metal housing 10. The recess 31 has a lower end surface 312 slightly upward protruded beyond lower edges 142 of the two notches 14. The plastic seat 30 is provided with two pairs of vertically extended guide channels, namely, two corresponding first guide channels 32 and two corresponding second guide channels 33. The first guide channels 32 and the second guide channels 33 are located at two different vertical planes, and the first guide channels 32 are located lower relative to the second guide channels 33. The plastic seat 30 is fixedly bonded to the metal housing 10. Two sidewardly protruded hooking projections 36 are formed at two lateral outer sides of the plastic seat 30 for extending into two through holes 16 correspondingly formed on the two sidewalls 13 of the metal housing 10, so as to lock the plastic seat 30 to the metal housing 10 and thereby assist in maintaining correct alignment of the plastic seat 30 with the metal housing 10.

The release control element 40 includes two sideward extensions 41 for engaging with the first guide channels 32 and two sideward protruded guide blocks 42 for engaging with the second guide channels 33 on the plastic seat 30, such that the release control element 40 can slide in the first and the second guide channels 32, 33 to move upward and downward relative to the plastic seat 30. The release control element 40 is further provided at a top with two upward projected blocks 43. When the release control element 40 is forced by the tension springs 50 to the highest possible position thereof, the upward projected blocks 43 are extended into the recess 31 of the plastic seat 30 and upward protruded beyond the lower edges 142 of the two notches 14 on the metal housing 10.

The tension springs 50 are located between the release control element 40 and the plastic seat 30 to normally force the release control element 40 to stay at a highest possible position. The release control element 40 is provided at predetermined positions with two blind holes 44 for separately receiving upper ends of the two tension springs 50 therein, so that the tension springs 50 are unchanged in position. The plastic seat 30 is correspondingly provided at a predetermined position with a support section 34, on which lower ends of the two tension springs 50 are supported. With these arrangements, the tension springs 50 can normally push the release control element 40 upward.

The horizontal hanging rail 20 includes a mounting plate portion 21 and a rail portion 22. The mounting plate portion 21 can be flatly attached to a wall surface and fixed thereto using screws (not shown). The rail portion 22 is forward protruded from the mounting plate portion 21 and horizontally extended a full length of the hanging rail 20. As can be clearly seen from FIGS. 3 and 5, the rail portion 22 has an upper end surface 23 inclined in the same direction as that of the inclined upper edges 141 of the two notches 14 on the metal housing 10. It is noted the inclined upper end surface 23 of the rail portion 22 has an inclination angle not larger than that of the inclined upper edges 141 of the two notches 14. The rail portion 22 has a downward and rearward inclined lower front end surface 25, such that the inclined lower front end surface 25 has a rear edge lower than a front edge thereof. A lower rear end surface of the rail portion 22 is formed into an open-bottomed channel 24, into which the upward projected blocks 43 on the top of the release control element 40 are normally extended under the elastic force of the tension springs 50.

Figure 8:
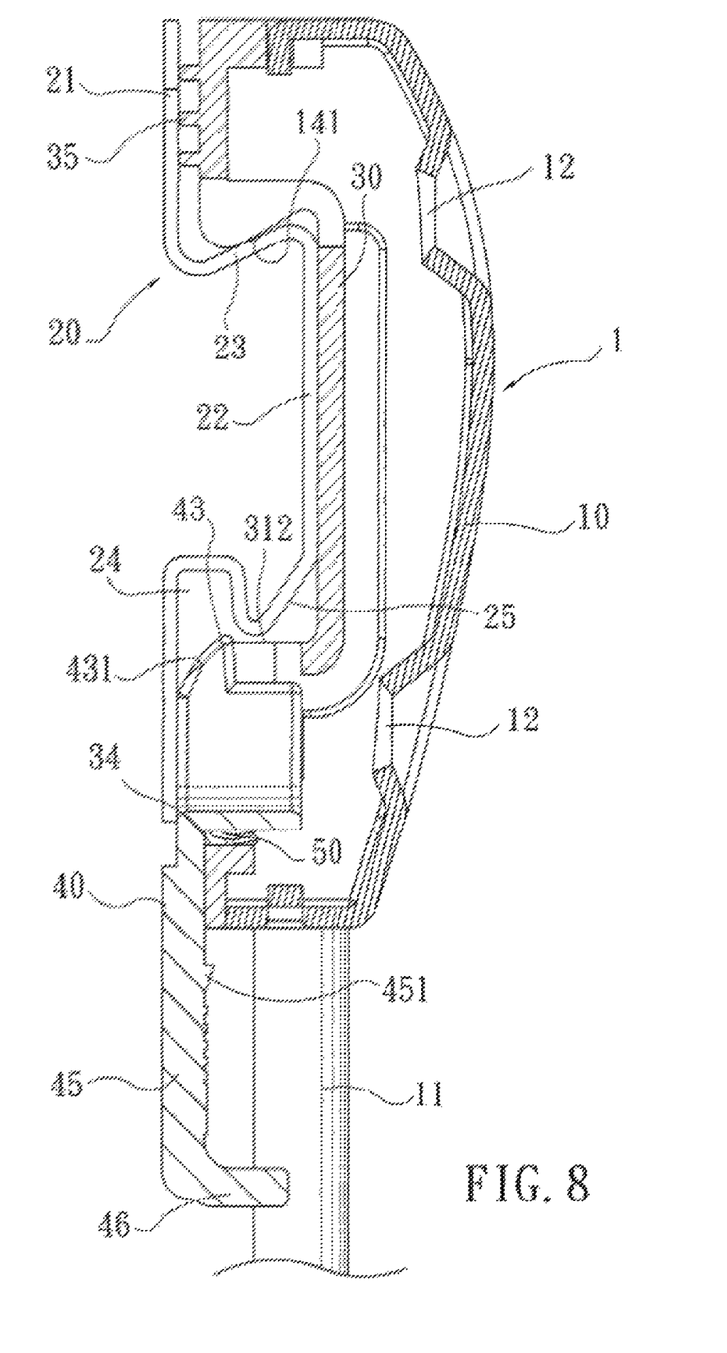
FIG. 8 shows the manner of releasing the hanger device of FIG. 2 from the horizontal hanging rail.

The release control element 40 also includes a downward extended vertical plate 45. A lower end of the vertical plate 45 is a forward extended horizontal section 46. By applying a downward force against the horizontal section 46, the release control element 40 can be pulled downward, so that the upward projected blocks 43 on the top of the release control element 40 are lowered to a position below the lower end surface 312 of the recess 31 on the plastic seat 30, as shown in FIG. 8. At this point, the whole hanger device 1 can be released from the horizontal hanging rail 20. The vertical plate 45 is provided on a front side with a horizontal rib 451 for abutting on a bottom of the plastic seat 30 to limit the highest possible position for the release control element 40 relative to the plastic seat 30.

The upward projected blocks 43 on the top of the release control element 40 each have a rearward and downward curved or inclined upper end surface 431, so that the projected blocks 43 have a relatively small thickness at an upper portion thereof and a relatively large thickness at a lower portion thereof.

Figure 6:
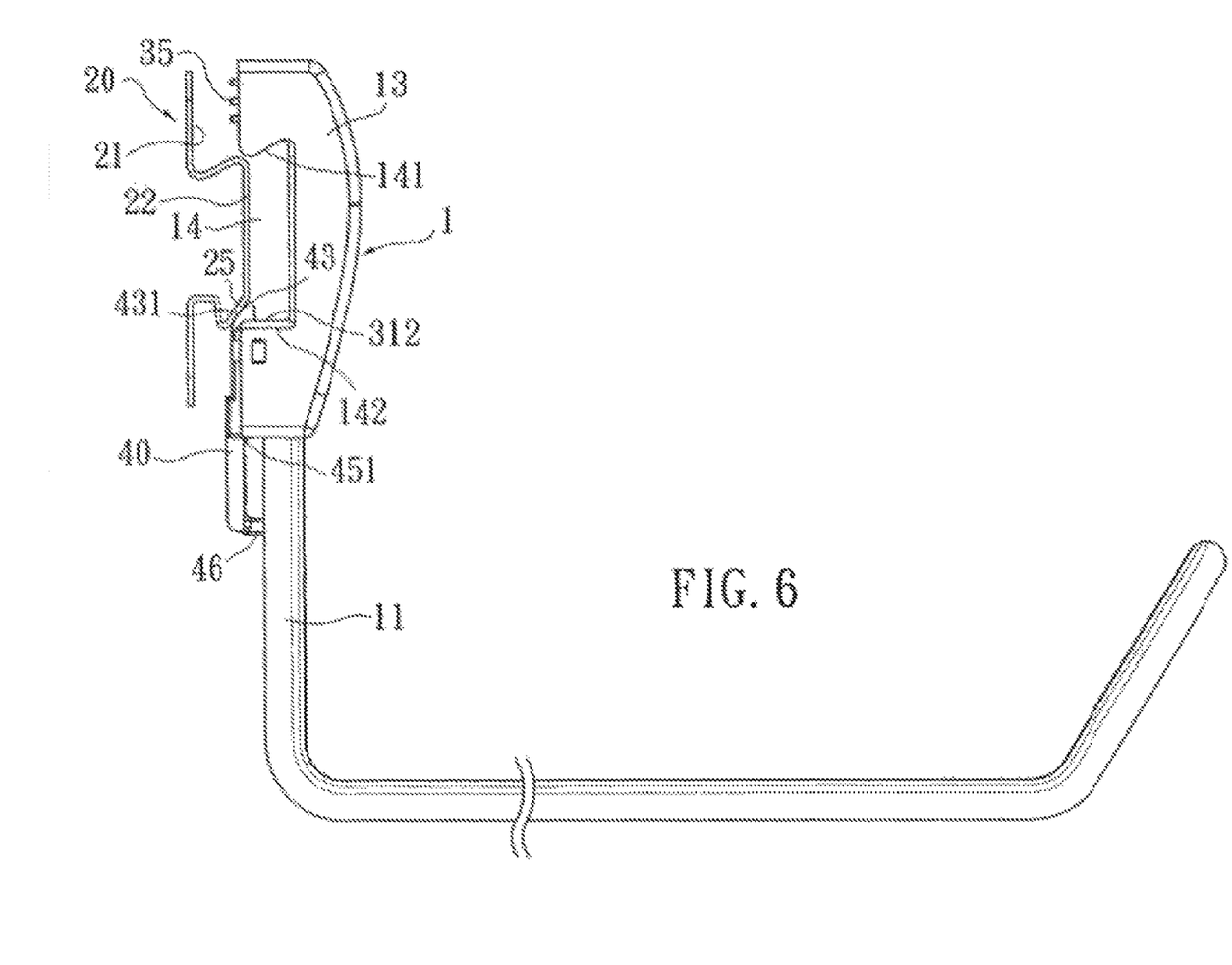
FIG. 6 is a first view showing the manner of attaching the hanger device of FIG. 2 to the horizontal hanging rail.
Figure 7:
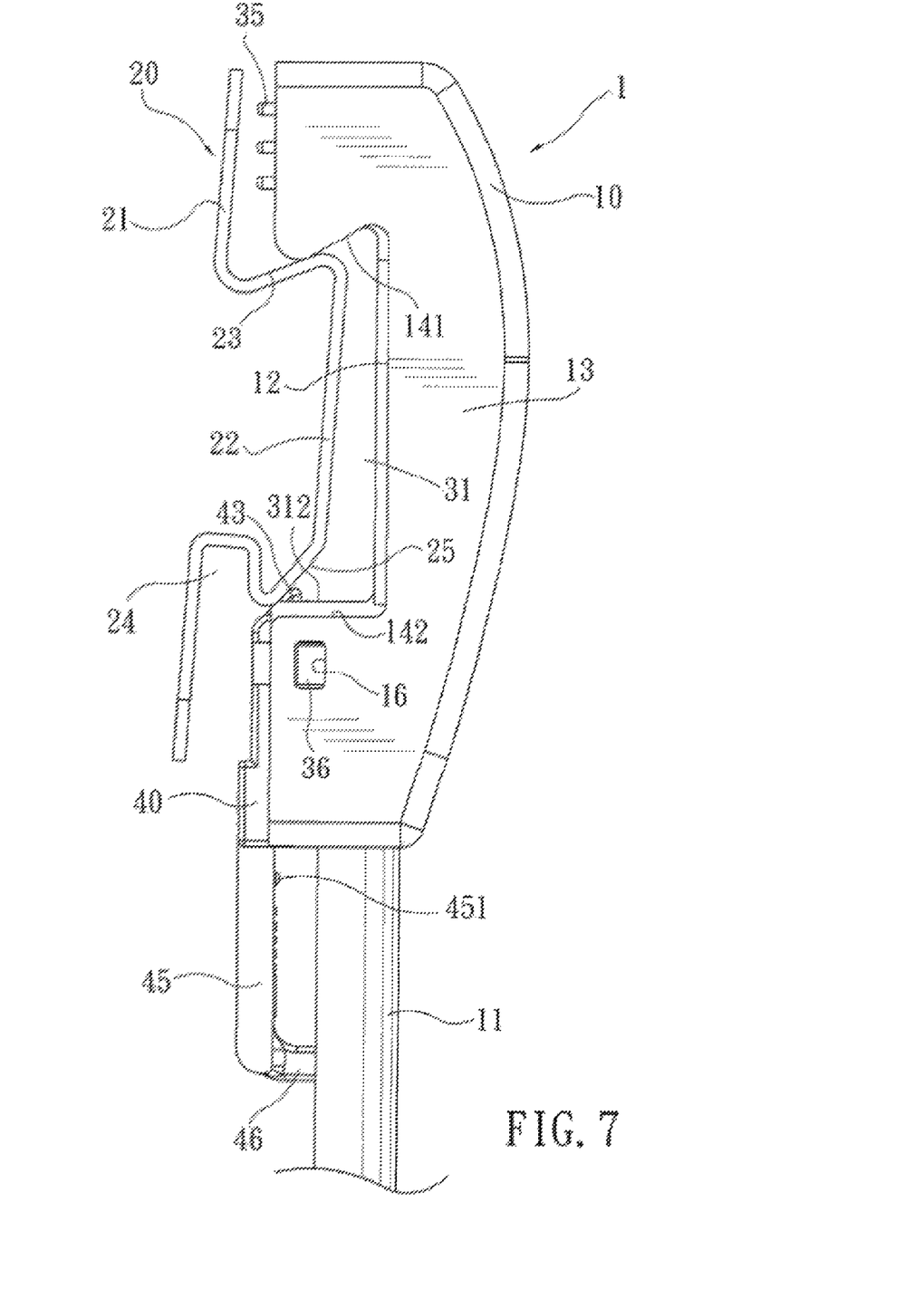
FIG. 7 is a second view showing the manner of attaching the hanger device of FIG. 2 to the horizontal hanging rail.

To hook the hanger device 1 to the horizontal hanging rail 20, first align the two notches 14 on the metal housing 10 with the forward protruded rail portion 22 of the horizontal hanging rail 20, as shown in FIG. 6. When the hanger device 1 is approached to the horizontal hanging rail 20, the inclined lower front surface 25 of the rail portion 22 will press against the upward projected blocks 43 on the top of the release control element 40, causing the release control element 40 to automatically slide downward, as shown in FIG. 7. Meanwhile, the tension springs 50 are further compressed between the release control element 40 and the plastic seat 30. After passing a lower edge of the rail portion 22, the projected blocks 43 will become aligned with the open-bottomed channel 24 behind the inclined lower front end surface 25 of the rail portion 22. At this point, a restoring force of the compressed tension springs 50 automatically pushes the release control element 40 upward, so that the two projected blocks 43 are moved into and held in the channel 24. With the projected blocks 43 held in the channel 24, the hanger device 1 is firmly attached to the horizontal hanging rail 20 without the risk of automatically separating therefrom. Please refer to FIG. 8. When a user downward pushes against the horizontal section 46 with a finger, the release control element 40 is moved downward under control, bringing the upward projected blocks 43 to release from the channel 24 of the horizontal hanging rail 20. At this point, the whole hanger device 1 can be easily removed from the horizontal hanging rail 20.

When the hanger device 1 is attached to the rail portion 22 of the horizontal hanging rail 20, the inclined upper edges 141 of the two notches 14 on the metal housing 10 are also hooked at their free ends to the upper end surface 23 of the rail portion 22 to provide an enhanced hooking effect. Further, the plastic seat 30 is provided on an upper rear end with three ribs 35, which are pressed against the mounting plate portion 21 of the horizontal hanging rail 20 to thereby force a top of the hanger device 1 outward against the upper end surface 23 of the rail portion 22, making the hanger device 1 more tightly hooked to the rail portion 22.

Figure 9:
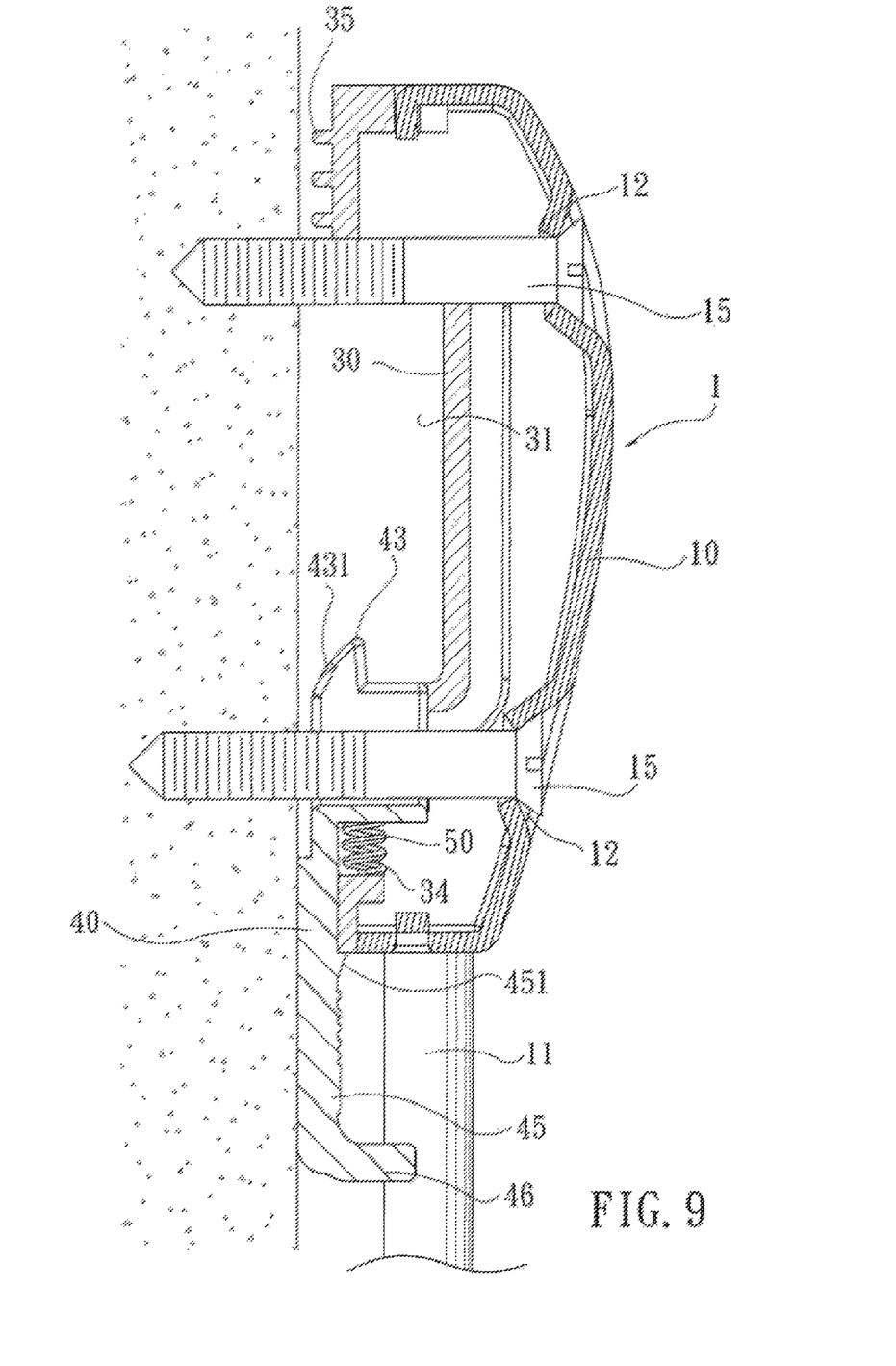
FIG. 9 shows the hanger device of FIG. 2 being directly mounted to a wall surface for use.

The hanger device 1 of the present invention can be otherwise directly mounted to a wall surface, as shown in FIG. 9. In this case, two screws 15 are threaded through two through holes 12 provided on the metal housing 10 into the wall surface, and the hanger device 1 is firmly connected to the wall.

When the hanger device 1 of the present invention is hooked and attached to the horizontal hanging rail 20, the inclined upper end surface 23 of the rail portion 22 provides a relatively large depth for coupling with the top of the hanger device 1, allowing the hanger device 1 to securely hook to the horizontal hanging rail 20.

The hanger device 1 of the present invention has the following advantages: (1) having a structure ensuring firm and tight attachment to the horizontal hanging rail 20 and accordingly provide increased hook load; and (2) having the release control element 40 to ensure the safe attachment of the hanger device 1 to the horizontal hanging rail 20 without the risk of automatically separating therefrom and accordingly ensuring high reliability in supporting an article thereon. Therefore, the present invention meets users' requirements and is practical for use.

What is claimed is:

1. A hanger device for hooking and attaching to a horizontal hanging rail, the horizontal hanging rail including a forward protruded rail portion, to which the hanger device is hooked and held in place, the hanger device comprising:
   a metal housing being an open-back case and having a hook connected to a bottom thereof; the metal housing having two rearward extended sidewalls, which are symmetrically provided at rear edges with two identical notches; each of the two notches having an inclined upper edge;
   a plastic seat being inserted into and thereby embedded in the metal housing via the open back thereof; the plastic seat having a generally central portion defining a transverse recess, the recess and the notches on the metal housing having the same longitudinal cross-sectional shape; the plastic seat being embedded in the metal housing, and the plastic seat being provided at a lower end with a pair of vertically extended first guide channels;
   a release control element having two sideward extensions for engaging with the first guide channels, so that the release control element is vertically slidable in the first guide channels relative to the plastic seat, and at least one upward projected block located at a top of the release control element; and the projected block being upward extended into the recess of the plastic seat and upward protruded beyond lower edges of the two notches on the metal housing when the release control element is in a highest possible position thereof relative to the plastic seat; and
   at least one tension spring being located between the release control element and the plastic seat to normally elastically force the release control element to the highest possible position relative to the plastic seat.

2. The hanger device as claimed in claim 1, wherein the rail portion of the horizontal hanging rail has a downward and rearward inclined lower front end surface, which has a rear edge lower than a front edge thereof.

3. The hanger device as claimed in claim 1, wherein the plastic seat is provided with a pair of vertically extended second guide channels, the second guide channels and the first guide channels being located in two different vertical planes; and the release control element being provided at positions corresponding to the second guide channels with two guide blocks for slidably engaging with the second guide channels.

4. The hanger device as claimed in claim 1, wherein the release control element includes a downward extended vertical plate, and the vertical plate being provided on a front side with a horizontal rib for abutting on a bottom of the plastic seat to limit the highest possible position for the release control element relative to the plastic seat.

5. The hanger device as claimed in claim 4, wherein the release control element includes a horizontal section forward extended from a lower end of the vertical plate.

6. The hanger device as claimed in claim 1, wherein the release control element is provided at a predetermined position with at least one blind hole for receiving an upper end of the at least one tension spring therein.

7. The hanger device as claimed in claim 6, wherein the plastic seat is provided at a predetermined position with a support section, on which a lower end of the at least one tension spring is supported.

8. A hanging system, comprising:
   a hanger device comprising:
      a metal housing being an open-back case and having a hook connected to a bottom thereof; the metal housing having two rearward extended sidewalls, which are symmetrically provided at rear edges with two identical notches; each of the two notches having an inclined upper edge;
      a plastic seat being inserted into and thereby embedded in the metal housing via the open back thereof; the plastic seat having a generally central portion defining a transverse recess, the recess and the notches on the metal housing having the same longitudinal cross-sectional shape; the plastic seat being embedded in the metal housing, and the plastic seat being provided at a lower end with a pair of vertically extended first guide channels;

a release control element having two sideward extensions for engaging with the first guide channels, so that the release control element is vertically slidable in the first guide channels relative to the plastic seat, and at least one upward projected block located at a top of the release control element; and the projected block being upward extended into the recess of the plastic seat and upward protruded beyond lower edges of the two notches on the metal housing when the release control element is in a highest possible position thereof relative to the plastic seat; and at least one tension spring being located between the release control element and the plastic seat to normally elastically force the release control element to the highest possible position relative to the plastic seat; and a horizontal hanging rail comprising a forward protruded rail portion, and the rail portion has an upper end surface inclined in the same direction as that of the inclined upper edges of the two notches on the metal housing and having an inclination angle not larger than that of the inclined upper edges of the two notches, and a lower rear end surface formed into an open-bottomed channel, into which the upward projected block on the top of the release control element is extended under an elastic force of a tension spring.

* * * * *